(12) United States Patent
Balde et al.

(10) Patent No.: US 10,989,094 B2
(45) Date of Patent: Apr. 27, 2021

(54) METHOD AND SYSTEM FOR DETERMINING A QUANTITY OF LIQUID IN A TANK

(71) Applicant: Plastic Omnium Advanced Innovation and Research, Brussels (BE)

(72) Inventors: Mamadou Saliou Balde, Remy (FR); Pierre-Andre Guitard, Amilly (FR); Nicolas Hubatzeck, Compiegne (FR); Jean-Philippe Rolland, Compiegne (FR); Yacouba Sanogo, Compiegne (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 121 days.

(21) Appl. No.: 16/335,595

(22) PCT Filed: Sep. 22, 2017

(86) PCT No.: PCT/EP2017/074117
§ 371 (c)(1),
(2) Date: Mar. 21, 2019

(87) PCT Pub. No.: WO2018/055128
PCT Pub. Date: Mar. 29, 2018

(65) Prior Publication Data
US 2020/0025055 A1    Jan. 23, 2020

(30) Foreign Application Priority Data
Sep. 22, 2016 (EP) .................................. 16306216

(51) Int. Cl.
*G01F 23/00* (2006.01)
*G01F 23/296* (2006.01)
(Continued)

(52) U.S. Cl.
CPC .......... *F01N 11/002* (2013.01); *F01N 3/2066* (2013.01); *G01F 23/0076* (2013.01);
(Continued)

(58) Field of Classification Search
CPC .. F01N 11/002; F01N 3/2066; F01N 2560/12; F01N 2610/02; F01N 2610/10;
(Continued)

(56) References Cited

U.S. PATENT DOCUMENTS 6,553,822 B2    4/2003 Morgan
6,615,657 B2    9/2003 Hongerholt et al.
(Continued)

FOREIGN PATENT DOCUMENTS

CN    101013045 A    8/2007
CN    101261069 A    9/2008
(Continued)

OTHER PUBLICATIONS

Ip.com NPL search based on search query—Jan. 19, 2021.*
(Continued)

*Primary Examiner* — Peter J Macchiarolo
*Assistant Examiner* — Anthony W Megna Fuentes
(74) *Attorney, Agent, or Firm* — Oblon, McClelland, Maier & Neustadt, L.L.P.

(57) ABSTRACT

It is proposed a method for determining a quantity of a liquid in a tank, the tank comprising: a first ultrasound subsystem capable of measuring level of liquid present above a predetermined threshold level within the tank; and at least one second ultrasound subsystem, said second ultrasound subsystem being associated with a sensing area within the tank and being configured to measure a parameter characteristic of the liquid, said sensing area being located below the predetermined threshold level. The method comprises in the steps of: —checking the validity of the measurement per-
(Continued)

formed by said first ultrasound subsystem (S10); —when it is detected that the measurement of said first ultrasound system is not valid: (a) checking (S22) the validity of the measurement performed by said second ultrasound subsystem; (b) determining (S24, S25, S26) a quantity of liquid, which quantity being based on a result of the validity check at step (a).

11 Claims, 3 Drawing Sheets

(51) Int. Cl.
| | |
|---|---|
| *G01F 25/00* | (2006.01) |
| *F01N 11/00* | (2006.01) |
| *F01N 3/20* | (2006.01) |
| *G01S 7/52* | (2006.01) |
| *G01S 15/87* | (2006.01) |
| *G01S 15/88* | (2006.01) |

(52) U.S. Cl.
CPC ...... *G01F 23/2962* (2013.01); *G01F 25/0061* (2013.01); *G01S 7/52004* (2013.01); *G01S 15/87* (2013.01); *G01S 15/88* (2013.01); *F01N 2560/12* (2013.01); *F01N 2610/02* (2013.01); *F01N 2610/10* (2013.01); *F01N 2610/1406* (2013.01); *F01N 2900/1814* (2013.01); *G01S 2007/52014* (2013.01)

(58) Field of Classification Search
CPC ..... F01N 2610/1406; F01N 2900/1814; F01N 11/00; G01F 23/0076; G01F 23/2962; G01F 25/0061; G01F 22/00; G01S 7/52004; G01S 15/87; G01S 15/88; G01S 2007/52014; Y02A 50/20; Y02T 10/12; Y02T 10/40

See application file for complete search history.

(56) References Cited

U.S. PATENT DOCUMENTS

| | | | |
|---|---|---|---|
| 8,733,153 | B2 | 5/2014 | Reimer et al. |
| 8,931,260 | B2* | 1/2015 | Minezawa ............. F01N 3/208 60/286 |
| 2004/0007061 | A1 | 1/2004 | Forgue |
| 2012/0118059 | A1 | 5/2012 | Reimer et al. |
| 2014/0250986 | A1 | 9/2014 | Reimer et al. |
| 2014/0366512 | A1 | 12/2014 | Hodgson et al. |
| 2015/0226595 | A1 | 8/2015 | Reimer et al. |
| 2016/0003120 | A1 | 1/2016 | Tsuchiya et al. |

FOREIGN PATENT DOCUMENTS

| | | |
|---|---|---|
| CN | 101842672 A | 9/2010 |
| CN | 104204436 A | 12/2014 |
| CN | 105067082 A | 11/2015 |
| CN | 105181007 A | 12/2015 |
| CN | 105387910 A | 3/2016 |
| CN | 106893607 A | 6/2017 |
| WO | WO 2014/135951 A1 | 9/2014 |

OTHER PUBLICATIONS

Ip.com Patent search based on PGPUB—Jan. 19, 2021.*
Ip.com Patent search based on search query—Jan. 19, 2021.*
IP.com Search query—Jan. 19, 2021.*
International Search Report dated Dec. 21, 2017 in PCT/EP2017/074117 filed on Sep. 22, 2017.

* cited by examiner

METHOD AND SYSTEM FOR DETERMINING A QUANTITY OF LIQUID IN A TANK

CROSS-REFERENCE TO RELATED APPLICATIONS

This application is a United States national stage application of International Application No. PCT/EP2017074117, filed Sep. 22, 2017, which designates the United States, and claims priority to European Patent Application No. 16306216.9, filed Sep. 22, 2016, and the entire contents of each of the above applications are incorporated herein by reference in entirety.

FIELD OF THE INVENTION

The present invention relates to liquid sensing systems and particularly to systems for determining the level of a liquid within a tank of a vehicle. For example, the liquid may be an aqueous solution, i.e. water. More particularly, the present invention relates to systems for determining the quality/concentration and the level of a liquid mixture within a tank of a vehicle. For example, the liquid mixture may be an aqueous urea solution stored in a tank of an SCR system (Selective Catalytic Reduction system) or a fuel mixture (i.e. diesel, gasoline) stored in a tank on board of a vehicle. A SCR (Selective Catalytic Reduction) system serves to reduce the nitrogen oxides by injecting a reducing agent, generally ammonia, into the exhaust line. This ammonia may be produced by the thermolytic decomposition of a solution of an ammonia precursor whereof the concentration may be eutectic. Such an ammonia precursor can be a urea solution, for example eutectic solutions of urea and water such as the one available under the commercial name AdBlue®, which is an aqueous solution composed of around 32.5% demineralized water and around 67.5% urea, and of which the urea content is between 31.8% and 33.2% by weight and which contain around 18% of ammonia. Alternatively, the liquid may be water stored in a tank of a water injection system on board of a vehicle. The term "water injection" is understood to mean that water is sprayed into the incoming air or fuel-air mixture, or directly into the cylinder to cool certain parts of the induction system where "hot points" could produce premature ignition. Depending on the engine, improvements in power and fuel efficiency can also be obtained solely by injecting water. Water injection may also be used to reduce NOx or carbon monoxide emissions. The technical effect of water injection is due to the fact that water has a very high heat of vaporization. As the ambient temperature water is injected into the engine, heat is transferred from the hot cylinder head and air intake into the water. The heat transfer enables the water to evaporate, and thus cooling the intake charge.

More precisely, the invention relates to a method for determining a quantity of liquid in such tank. In the present description, "liquid" has usually to be understood as "in a liquid state", except when it is explicitly mentioned that the liquid is "in a frozen state". In such a frozen state, liquid in a frozen state is not enough free to be used out of the tank.

BACKGROUND OF THE INVENTION

U.S. Pat. No. 8,733,153B2 discloses a sensing system for determining both a quality and a quantity of a urea solution in a vehicle tank. The sensing system includes two piezoelectric ultrasonic transducers. A quality transducer is positioned to reflect ultrasonic sound waves off a reflector and a level transducer is positioned to reflect ultrasonic sound waves off a surface of the urea solution. U.S. Pat. No. 8,733,153B2 further discloses a method for determining the validity of an ultrasonic echo. It is known that the level transducer cannot sense levels which are below a threshold level of detection, also called deadband level, which defines a deadband between a zero level, i.e. the bottom of the tank where the ultrasonic sound waves of the level transducer are emitted, and the deadband level. Generally, this deadband is due to acoustic wave ringing phenomena. This document does not describe how to determine a quantity of urea solution when the level of urea solution is below the deadband level.

SUMMARY OF THE INVENTION

It is an object of embodiments of the invention to provide a method for determining a quantity of liquid when the level of liquid in the tank is below the level transducer deadband level. It is another object of embodiments of the invention to provide a method which allows determining a quantity of liquid during a thawing operation of a frozen liquid, and in particular a frozen urea solution.

According to a first aspect of the invention there is provided a method for determining a quantity of a liquid (or liquid mixture) in a tank, the tank comprising:
   a first ultrasound subsystem capable of measuring level of liquid present above a predetermined threshold level within the tank;
   at least one second ultrasound subsystem, said second ultrasound subsystem being associated with a sensing area within the tank and being configured to measure a parameter characteristic of the liquid, said sensing area being located below the predetermined threshold level.
The method comprises the steps of:
   (a) checking the validity of the measurement performed by said second ultrasound subsystem;
   (b) determining a quantity of liquid based on a result of the validity check at step (a).

More precisely, the invention relates to a method for determining a quantity of a liquid (or liquid mixture) in a tank, the tank comprising:
   a first ultrasound subsystem capable of measuring level of liquid present above a predetermined threshold level within the tank;
   at least one second ultrasound subsystem, said second ultrasound subsystem being associated with a sensing area within the tank and being configured to measure a parameter characteristic of the liquid, said sensing area being located below the predetermined threshold level.
The method comprises the steps of:
   checking the validity of the measurement performed by said first ultrasound subsystem;
   when it is detected that the measurement of said first ultrasound system is not valid: (a) checking the validity of the measurement performed by said second ultrasound subsystem;
   (b) determining a quantity of liquid, which quantity being based on a result of the validity check at step (a).

Thus, a quantity of liquid is determined, whether or not the measurements performed by the first and the second ultrasound subsystem are determined valid.

For example, at a non-freezing temperature of the liquid and when the level of liquid in the tank is below the deadband level of the first ultrasound subsystem it can be detected that the measurement of the first ultrasound subsystem is not valid. In such a situation, it is particularly advantageous to provide a liquid quantity estimation (determination) via the assessment of the operational state of the second ultrasound subsystem.

The tank of the invention is equipped with a first ultrasound subsystem (i.e. level sensor) for the purpose of measuring the level of liquid in the tank and with one or several other ultrasound subsystem(s) for other purposes. The first ultrasound subsystem exhibits a deadband level (i.e. predetermined threshold level) below which the first ultrasound subsystem cannot sense the level of liquid. The idea behind the present invention is to verify the validity of the measurement performed by the second ultrasound subsystem(s), which are present in the tank for other purposes than measuring the level of liquid, for determining the presence or absence of liquid in sensing area(s) located below the deadband level.

The present invention is further based on the insight that the detection of a valid measurement in a given sensing area is indicative of the presence of liquid within said given sensing area. In an advantageous embodiment, it is proposed to associate a predetermined quantity value to each sensing area. The quantity values can be calculated in advance and stored in a look-up table. For example, the quantity of liquid can easily be derived as a function of the position of the sensing area within the tank and the physical dimensions of the tank. In a particular embodiment, the quantity of liquid is then determined or interpolated from the look-up table as a function of the result of the validity check, i.e. in which sensing area(s) it has been detected a valid measurement.

As mentioned above, the second ultrasound subsystem(s) is(are) not configured to measure levels of liquid but, on the contrary, is(are) configured to measure parameter(s) characteristic of the liquid. For example, such parameter can be a physical property (thermal capacity, electrical conductivity) or a chemical property (concentration, pH).

In a particular embodiment, each ultrasound subsystem comprises a piezoelectric ultrasonic transducer.

In an advantageous embodiment, the first ultrasound subsystem and the second ultrasound subsystem can be mounted/assembled on a same module (or support), so as to form a single sensing unit.

Advantageously, the first and second ultrasound subsystems are configured to generate a sound wave and to detect an echo of the sound wave (i.e. reflected wave). In a particular embodiment of the invention, it is detected that the measurement is valid when the echo is received by the first ultrasound system, respectively by the second ultrasound subsystem, within a predetermined time period and/or when an amplitude of the echo lies within a predetermined range. This allows a more accurate and robust validity check.

In a particular embodiment, the method comprises:
detecting if the liquid is in a frozen state;
when detecting that the liquid is in a frozen state, heating the liquid in a frozen state;
performing step (a) then performing step (b).

Preferably, step (a) then step (b) are performed simultaneously to the heating step.

In a particular embodiment, the liquid is an aqueous urea solution. In colder climates, the urea solution stored in the tank is prone to freezing, since the freezing temperature of a eutectic water-urea mixture is as high as −11° C. For this reason, the tank is normally equipped with a heating device. For example, the heating device can be an electrical heater. In addition, the tank is normally equipped with a temperature sensor. In this particular embodiment, when the temperature sensor detects a temperature below −11° C. the heating device is activated to thaw the frozen urea solution. It is an advantage of the present invention that it provides a liquid quantity value before the end of the thawing process (i.e. by heating). For example, it is therefore possible, during the thawing process, to detect and supply a needed quantity of liquid to a consuming unit on board the vehicle. In known systems the liquid quantity value is generally obtained at the end of the thawing process.

In an advantageous embodiment, the method comprises:
(c) checking the validity of the measurement performed by said first ultrasound subsystem;
(d) determining a quantity of liquid based on a result of the validity check at steps (a) and (c).

Step (c) can be performed after or at the same time as step (a).

Thus, the first ultrasound subsystem can be used to determine a quantity of liquid even under the deadband level. Indeed, a level value given by the first ultrasound system which is under the deadband level can be considered as valid when it is detected that the measurement performed by the second ultrasound system is valid. This is possible because the deadband level is a given value with a security margin, in order to guarantee that the values are valid when the liquid level is above the deadband level. Thus, even when the liquid level is under the deadband level, it is possible according to this embodiment to use a level value of the first ultrasound subsystem for determining a quantity of liquid, if the received echoes from the second ultrasound subsystem are valid.

Advantageously, step (b) includes a step of retrieving a predetermined quantity from a lookup table.

Advantageously, the second ultrasound subsystem is configured to measure a concentration value of a constituent of the liquid. Thus, the second ultrasound subsystem is a quality sensor.

Advantageously, the liquid is an aqueous solution, especially an aqueous urea solution or water.

According to a further aspect, the invention relates to a system comprising:
a tank comprising:
a first ultrasound subsystem capable of measuring level of liquid present above a predetermined threshold level within the tank;
at least one second ultrasound subsystem, said second ultrasound subsystem being associated with a sensing area within the tank and being configured to measure a parameter characteristic of the liquid in the tank, said sensing area being located below the predetermined threshold level,
an electronic controller configured to:
check the validity of the measurement performed by said first and second ultrasound subsystems;
determine a quantity of liquid, which quantity being based on a result of the validity checks.

Advantageously, the electronic controller is further configured to perform the steps of the method as described above.

Advantageously, the system comprises a temperature sensor configured to detect if the liquid is in a frozen state, preferably grouped on a same module with the first ultrasound subsystem and the second ultrasound subsystem.

According to another aspect of the invention, there is provided a vehicle comprising the system described above.

BRIEF DESCRIPTION OF THE DRAWINGS

The following drawings are illustrative of exemplary embodiments and therefore do not limit the scope of the invention. They are presented to assist in providing a proper understanding of the invention. The present invention will hereinafter be described in conjunction with the accompanying figures, in which.

DETAILED DESCRIPTION OF THE INVENTION

Figure 1:
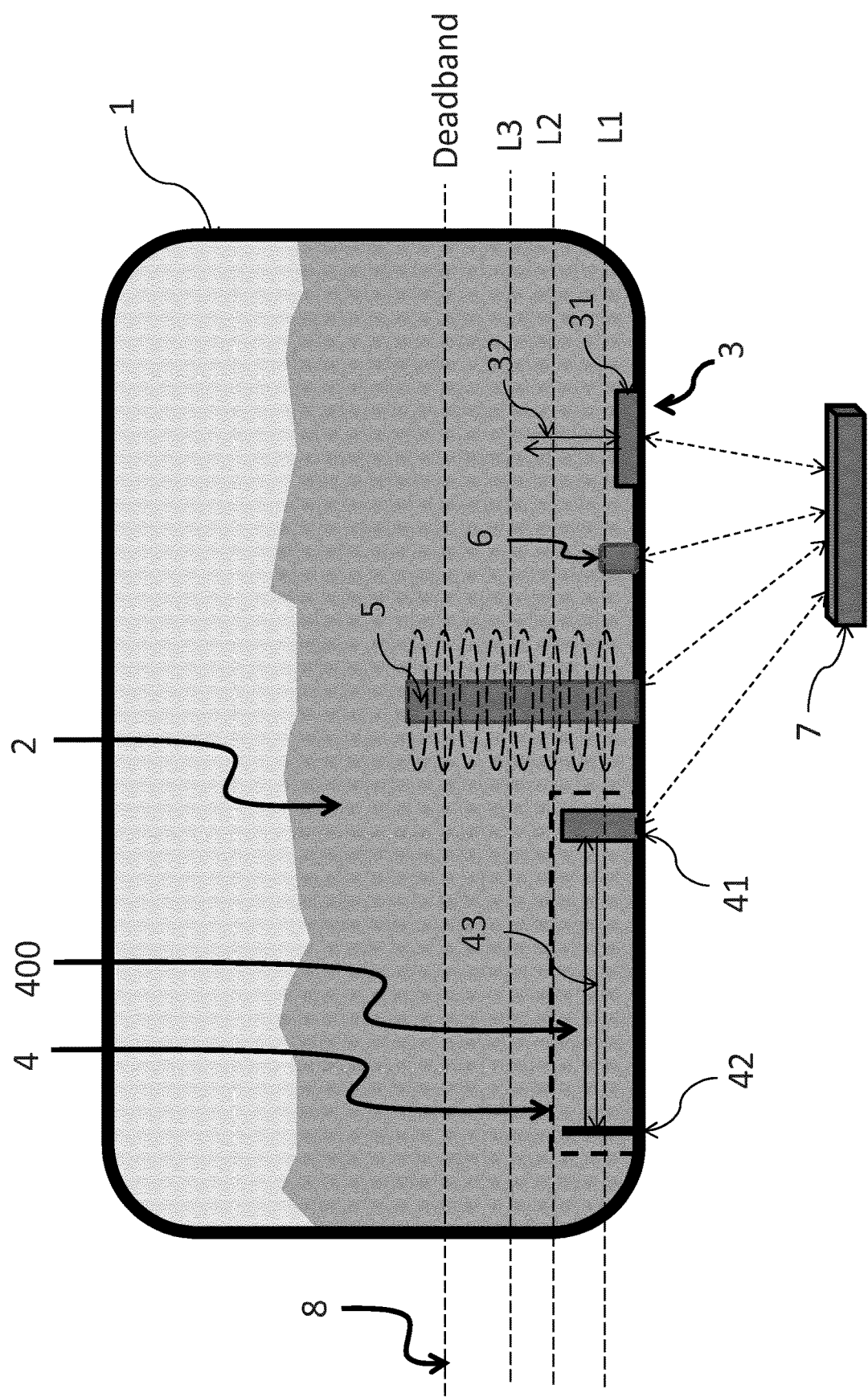
FIG. 1 is a schematic view of an exemplary embodiment of a vehicle liquid storage system to which the present invention may be applied.

FIG. 1 illustrates an exemplary embodiment of a vehicle liquid storage system. As illustrated in the example of FIG. 1, the system comprises:

- a tank [1] for the storage of a liquid [2], for example aqueous urea solution;
- a liquid sensing system according to a particular embodiment of the present invention;
- a heater [5] for heating the liquid and/or the liquid in a frozen state in case of freezing in cold conditions (for example at −11° C.); and
- a temperature sensor [6].

In the example of FIG. 1, the liquid sensing system comprises a first ultrasound subsystem [3] for determining a level of liquid within the tank, a second ultrasound subsystem [4] for determining a concentration of a constituent of the liquid, and a controller [7] (also called electronic control unit or ECU).

The first ultrasound subsystem [3] comprises a first piezoelectric ultrasonic transducer [31] positioned such that ultrasonic sound waves produced by the transducer reflect off the interface of the liquid with a vapor space in the tank (i.e. space not occupied by liquid but filled with gas). The use of pulse-echo method (i.e. speed of sound technique) for determining the level of a liquid in a tank is well known and will not be described in any further detail. As illustrated in the example of FIG. 1, the first ultrasound subsystem [3] exhibits a deadband level [8] below which the first ultrasound subsystem cannot sense the level of liquid.

The second ultrasound subsystem [4] comprises a second piezoelectric ultrasonic transducer [41] and a reflector [42]. The reflector [42] is located at a known distance from the second ultrasonic transducer [41]. Ultrasonic sound waves [43] generated by the second ultrasonic transducer [41] propagate through the liquid and are reflected off the reflector [42] back towards the second ultrasonic transducer [41]. The reflected ultrasonic sound wave [43] is detected by the second ultrasonic transducer [41], and reflects off the second ultrasonic transducer [41] back towards the reflector [42]. The ultrasonic sound wave [43] can travel back and forth between the reflector [42] and the second ultrasonic transducer [41] several times. The use of pulse-echo method (i.e. speed of sound technique) for determining the concentration/quality of a liquid is well known and will not be described in any further detail. As illustrated in the example of FIG. 1, the second ultrasound subsystem [4] is associated with a sensing area [400] where ultrasonic sound waves can travel back and forth. The sensing area [400] is located below the deadband level [8].

In an alternative embodiment, the first ultrasound subsystem [3], the second ultrasound subsystem [4] and the temperature sensor [6] can be grouped on a same module (or support).

The controller [7] includes a set of computer-executable instructions, as described below in relation to FIG. 2, which allow the controller to determine a quantity of liquid in the tank [1]. These instructions may be provided, for example, in a RAM of the controller. Alternatively, the instructions may be contained on a data storage device with a computer readable medium (for example, USB key or CD-ROM).

Figure 2:
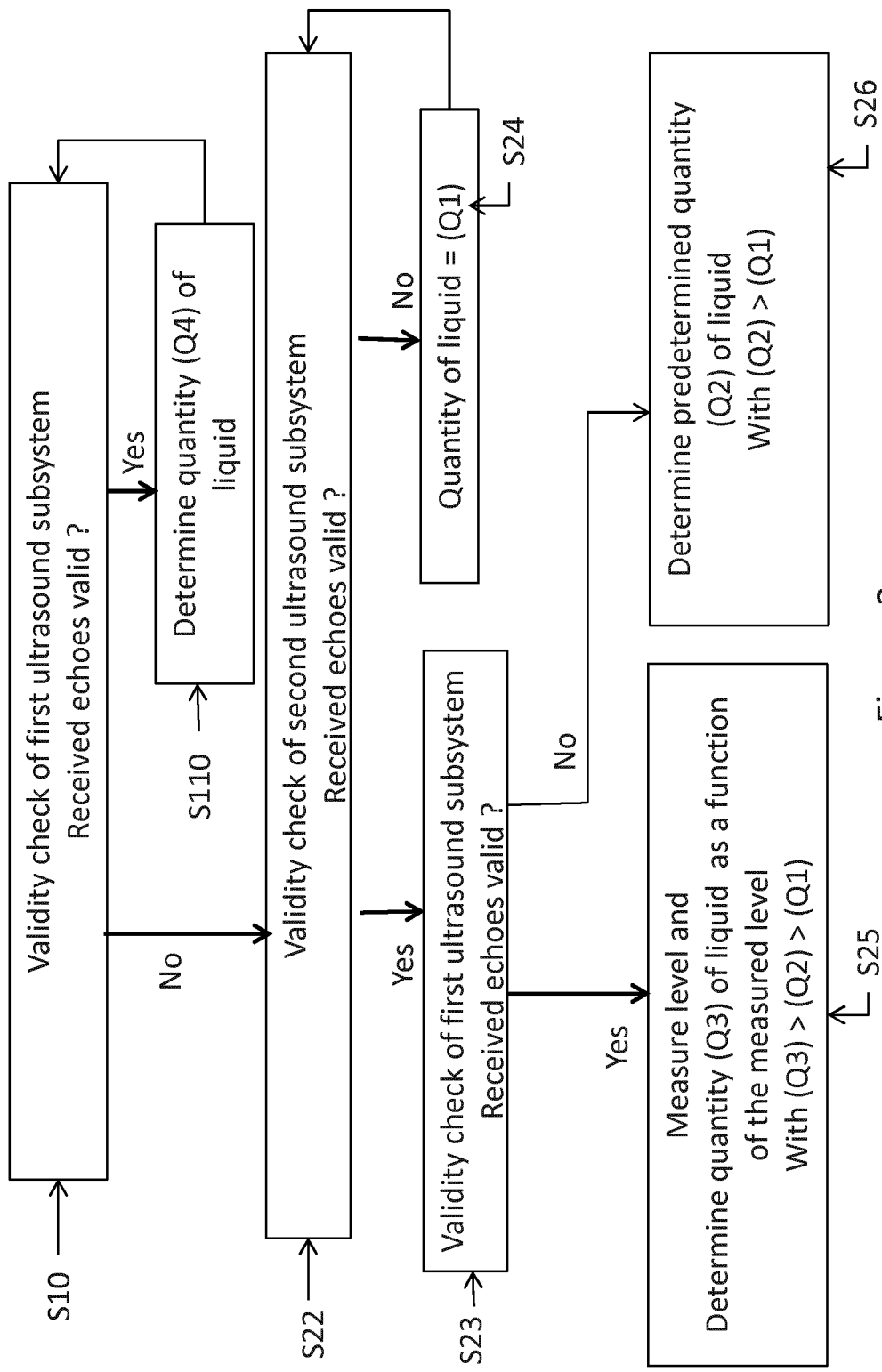
FIG. 2 illustrates a flowchart of operations depicting logical operational steps for determining a quantity of liquid in the system of FIG. 1, in accordance with a particular embodiment of the invention.

FIG. 2 illustrates a flowchart of instructions depicting logical operational steps for determining a quantity of liquid in the tank, in accordance with a particular embodiment of the invention.

In the example of FIG. 2, at step S10 the controller [7] turns on the first ultrasonic transducer [31] (i.e. level sensor) and determines if ultrasonic echoes [32] received from the first ultrasonic transducer [31] are valid. In a particular embodiment, an ultrasonic echo is determined to be valid when the echo is received within a predetermined time period. In an alternative embodiment, an echo is further determined to be valid when the number of echo reflections is within a predetermined range.

If the received echoes are determined to be valid at step 10, the controller [7] executes step S110, wherein a quantity of liquid is determined, based on the echoes received from the first ultrasonic transducer [31]. At step S110, the controller [7] determines the presence of liquid above the deadband level [8] and determines a quantity (Q4) of liquid as a function of the level measured by the first ultrasonic transducer [31]. If the received echoes are determined to be unvalid at step 10, the controller [7] executes step S22.

At step S22, the controller [7] turns on the second ultrasonic transducer [41] (i.e. concentration sensor) and determines if ultrasonic echoes [43] received from the second ultrasonic transducer [41] are valid. In a particular embodiment, an ultrasonic echo is determined to be valid when the echo is received within a predetermined time period. In an alternative embodiment, an echo is further determined to be valid when the number of echo reflections is within a predetermined range.

If the received echoes [43] are considered valid, then the controller [7] determines the presence of liquid within the sensing area [400] and continues at step S23.

If the received echoes [43] are considered invalid, then the controller [7], for example, estimates (step S24) that the quantity of liquid in the tank is equal to a predetermined quantity (Q1) of liquid retrieved by the controller [7], for example, from a lookup table, that is a function of at least temperature and/or rate. Then the controller [7] continues the validity check of the second ultrasound subsystem (i.e. check for valid echoes received from the second ultrasonic transducer [41]).

At step S23, the controller [7] turns on the first ultrasonic transducer [31] (i.e. level sensor) and determines if ultrasonic echoes received from the first ultrasonic transducer [31] are valid. In a particular embodiment, an ultrasonic echo is determined to be valid when the echo is received within a predetermined time period. In an alternative embodiment, an echo is further determined to be valid when the number of echo reflections lies within a predetermined range. Thus, even when the liquid level (L3) is slightly under the deadband level [8], it is possible to use a level value of the first ultrasound subsystem for determining a quantity of liquid. In other words, at this step S23, the predetermined time period or predetermined range to determine if a received echo is valid may differ from the predetermined time period or predetermined range used at step S10, because the received echoes from the second ultrasound subsystem are determined valid.

If the received echoes are considered invalid, then the controller [7] determines the presence of liquid within the sensing area [400] and that there is no liquid above the deadband level [8]. Then the controller [7], for example, retrieves (step S26) from a lookup table a predetermined quantity (Q2) of liquid derived as a function of the position of the sensing area [400] within the tank and the physical dimensions of the tank. It is to note that (Q2)>(Q1).

If the received echoes are considered valid, then the controller [7] determines the presence of liquid above the level (L3) and determines (step S25) a quantity (Q3) of liquid as a function of the level measured by the first ultrasonic transducer [31]. It is to note that (Q3)>(Q2).

Figure 3:
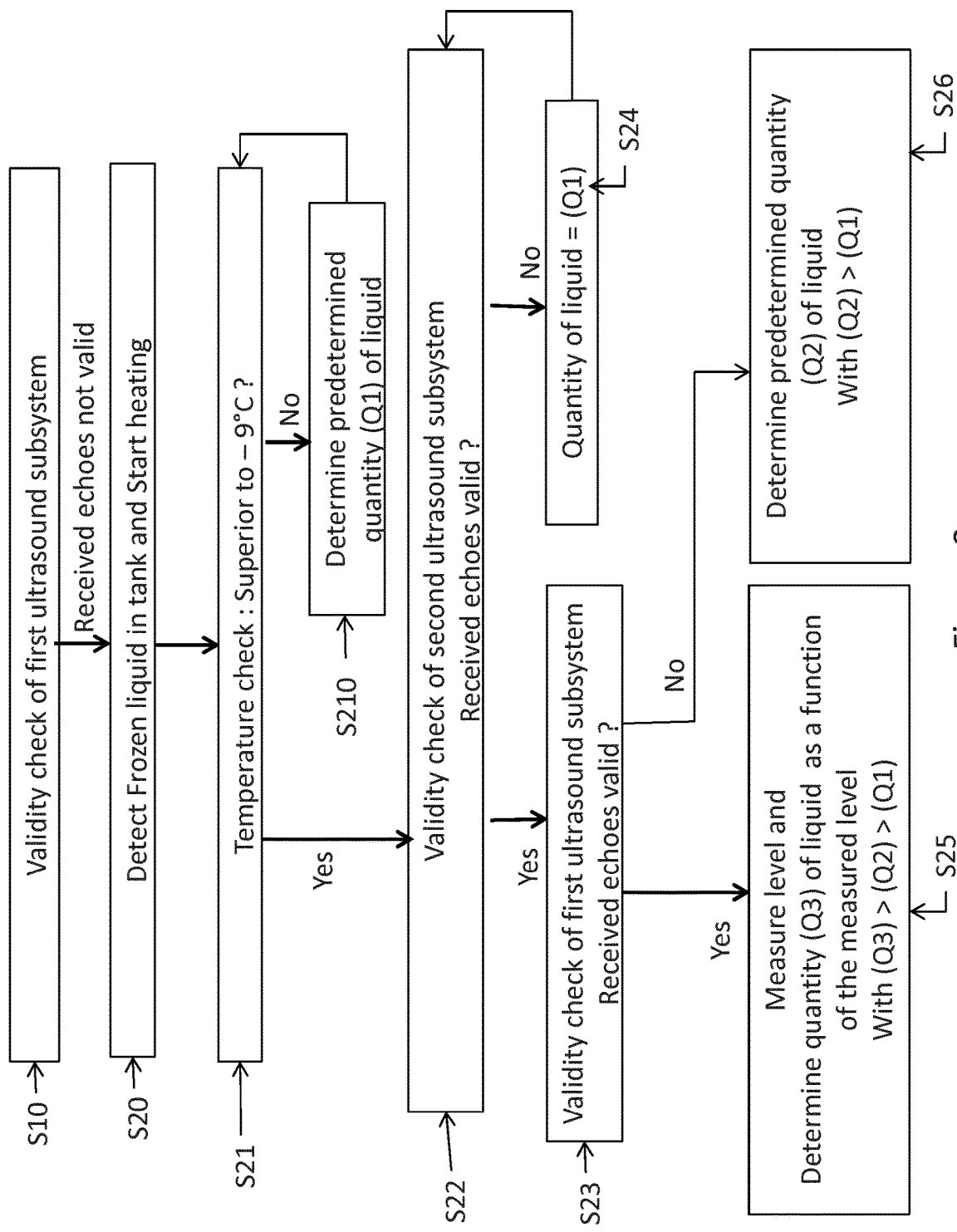
FIG. 3 illustrates a flowchart of operations depicting logical operational steps for determining a quantity of liquid in the system of FIG. 1, in accordance with another particular embodiment of the invention.

FIG. 3 illustrates a flowchart of instructions depicting logical operational steps for determining a quantity of liquid in the tank, in accordance with a particular embodiment of the invention.

In the example of FIG. 3, at step S20 the controller [7] detects by means of the temperature sensor [6] a situation where the entire content of the tank is frozen. For example, the temperature sensor [6] detects a temperature below −11° C. The controller [7] then determines that there is no liquid available in the tank and turns on the heater [5] for thawing the frozen liquid (for example, frozen urea solution).

At step S21, the controller [7] uses the temperature sensor [6] and performs a test which consists in determining whether the measured temperature is higher than a predetermined threshold temperature. For example, this threshold can be set such that it corresponds to −9° C. If the answer to test S21 is "yes", the controller [7] executes step S22. On the other hand, if the answer to test S21 is "no", then the controller [7], for example, retrieves (step S210) from a lookup table a predetermined quantity (Q1) of liquid that is a function of the heating period, temperature and/or rate. Then the controller [7] continues the temperature check. It is to note that the heating continues.

At step S22, the controller [7] turns on the second ultrasonic transducer [41] (i.e. concentration sensor) and determines if ultrasonic echoes [43] received from the second ultrasonic transducer [41] are valid. In a particular embodiment, an ultrasonic echo is determined to be valid when the echo is received within a predetermined time period. In an alternative embodiment, an echo is further determined to be valid when the number of echo reflections is within a predetermined range.

If the received echoes [43] are considered valid, then the controller [7] determines the presence of liquid within the sensing area [400] and continues at step S23.

If the received echoes [43] are considered invalid, then the controller [7], for example, estimates (step S24) that the quantity of liquid in the tank is still equal to the quantity (Q1) determined at step S210. Then the controller [7] continues the validity check of the second ultrasound subsystem (i.e. check for valid echoes received from the second ultrasonic transducer [41]).

It is to note that the heating continues.

As illustrated in the example of FIG. 3, at step S22 there is liquid in the tank up to level (L1). Above level (L1), liquid is still in a frozen state. In this example, at step S22 it is then detected invalid echoes received from the second ultrasonic transducer [41].

At step S23, the controller [7] turns on the first ultrasonic transducer [31] (i.e. level sensor) and determines if ultrasonic echoes received from the first ultrasonic transducer [31] are valid. In a particular embodiment, an ultrasonic echo is determined to be valid when the echo is received within a predetermined time period. In an alternative embodiment, an echo is further determined to be valid when the number of echo reflections lies within a predetermined range. Thus, even when the liquid level (L3) is slightly under the deadband level [8], it is possible to use a level value of the first ultrasound subsystem for determining a quantity of liquid. In other words, at this step S23, the predetermined time period or predetermined range to determine if a received echo is valid may differ from the predetermined time period or predetermined range used at step S10, because the received echoes from the second ultrasound subsystem are determined valid and may be used in combination with the received echoes from the first ultrasound subsystem for determining a quantity of liquid.

If the received echoes are considered invalid, then the controller [7] determines the presence of liquid within the sensing area [400] and that there is no liquid above the deadband level [8]. Then the controller [7], for example, retrieves (step S26) from a lookup table a predetermined quantity (Q2) of liquid derived as a function of the position of the sensing area [400] within the tank and the physical dimensions of the tank. It is to note that (Q2)>(Q1).

If the received echoes are considered valid, then the controller [7] determines the presence of liquid above the level (L3) and determines (step S25) a quantity (Q3) of liquid as a function of the level measured by the first ultrasonic transducer [31]. It is to note that (Q3)>(Q2).

As illustrated in the example of FIG. 3, at step S23 there is liquid in the tank up to level (L2). Level (L2) is below the deadband level [8] and level (L3). Above level (L2), liquid is still in a frozen state. In this example, at step S23 it is then detected invalid echoes [32] received from the first ultrasonic transducer [31].

Although the invention has been described hereinabove by reference to specific embodiments, this is done for illustrative and not for limiting purposes. Moreover, features disclosed relating to one particular embodiment may be combined with features from other embodiments to obtain the same technical effects and advantages, without leaving the scope of the present invention.

The invention claimed is:

1. A method for determining a quantity of a liquid in a tank, the tank comprising: a first ultrasound subsystem configured to measure a level of liquid present above a predetermined threshold level within the tank; and at least one second ultrasound subsystem, said second ultrasound subsystem being associated with a sensing area within the tank and being configured to measure a parameter characteristic of the liquid, said sensing area being located below the predetermined threshold level, the method comprising: checking the validity of a measurement performed by said first ultrasound subsystem; detecting that the measurement of said first ultrasound system is not valid: (a) checking the validity of a measurement performed by said second ultrasound subsystem; and (b) determining a quantity of liquid, which quantity being based on a result of the validity check at step (a).

2. The method according to claim 1, said first and second ultrasound subsystems being configured to generate a sound wave and to detect an echo of the sound wave, wherein it is detected that the measurement is valid when the echo is received by said first ultrasound subsystem, respectively by said second ultrasound subsystem, within a predetermined time period and/or when an amplitude of the echo is within a predetermined range.

3. The method according to claim 1, further comprising: detecting that the liquid is in a frozen state; and heating the frozen liquid; wherein the performing step (a) then performing step (b) is performed simultaneously with the heating the frozen liquid.

4. The method according to claim 1, further comprising:
(c) checking the validity of the measurement performed by said first ultrasound subsystem;
(d) determining a quantity of liquid based on a result of the validity check at steps (a) and (c).

5. The method according to claim 1, wherein said step (b) includes a step of retrieving a predetermined quantity from a lookup table.

6. The method according to claim 1, wherein said second ultrasound subsystem is configured to measure a concentration value of a constituent of the liquid.

7. The method according to claim 1, wherein the liquid is an aqueous solution or water.

8. The method according to claim 7, wherein the aqueous solution is an aqueous urea solution.

9. A system comprising: a tank comprising: a first ultrasound subsystem configured to measure a level of liquid present above a predetermined threshold level within the tank; and at least one second ultrasound subsystem, said second ultrasound subsystem being associated with a sensing area within the tank and being configured to measure a parameter characteristic of the liquid in the tank, said sensing area being located below the predetermined threshold level: and an electronic controller configured to: check the validity of a measurement performed by said first and second ultrasound subsystems; determine a quantity of liquid, which quantity being based on a result of the validity checks, wherein the electronic controller is further configured to perform the steps of the method of claim 1.

10. The system of claim 9, comprising a temperature sensor configured to detect that the liquid is in a frozen state.

11. A vehicle comprising the system according to claim 9.

* * * * *